United States Patent
Schileo

(10) Patent No.: US 10,006,595 B2
(45) Date of Patent: Jun. 26, 2018

(54) RECHARGEABLE LIGHTING ATTACHMENT FOR MAGNIFYING LENSES

(71) Applicant: Alberto Schileo, Paris (FR)

(72) Inventor: Alberto Schileo, Paris (FR)

( * ) Notice: Subject to any disclaimer, the term of this patent is extended or adjusted under 35 U.S.C. 154(b) by 219 days.

(21) Appl. No.: 15/062,225

(22) Filed: Mar. 7, 2016

(65) Prior Publication Data

US 2016/0265730 A1 Sep. 15, 2016

(30) Foreign Application Priority Data

Mar. 11, 2015 (HK) .................................. 15102497.7

(51) Int. Cl.
| | | |
|---|---|---|
| *G02B 25/02* | (2006.01) | |
| *F21L 4/02* | (2006.01) | |
| *F21L 4/08* | (2006.01) | |
| *F21V 7/00* | (2006.01) | |
| *F21Y 101/02* | (2006.01) | |
| *F21Y 105/00* | (2016.01) | |

(52) U.S. Cl.
CPC .................. *F21L 4/02* (2013.01); *F21L 4/08* (2013.01); *F21V 7/0058* (2013.01); *G02B 25/02* (2013.01); *F21Y 2101/02* (2013.01); *F21Y 2105/003* (2013.01)

(58) Field of Classification Search
CPC .. G02B 25/02; F21L 4/027; F21L 4/08; F21Y 2105/18; F21V 23/006; F21V 23/007; F21V 23/009; F21V 33/00
See application file for complete search history.

(56) References Cited

U.S. PATENT DOCUMENTS

| | | | | |
|---|---|---|---|---|
| 6,322,226 | B1 * | 11/2001 | Dickson | G02B 27/025 359/802 |
| 6,502,976 | B1 * | 1/2003 | Bernhard | F21S 9/02 362/190 |
| 6,663,260 | B1 * | 12/2003 | Tieszen | G01N 21/8806 362/249.02 |
| 6,999,248 | B2 * | 2/2006 | Schuttinger | G02B 25/02 359/802 |
| 7,004,599 | B2 * | 2/2006 | Mullani | A45D 42/10 359/488.01 |
| 7,006,223 | B2 * | 2/2006 | Mullani | A61B 5/0059 356/369 |
| 7,599,135 | B2 * | 10/2009 | Feng | G02B 25/008 359/803 |
| 8,342,710 | B2 * | 1/2013 | Rahbar-Dehghan | G01N 21/94 362/109 |
| 9,377,615 | B2 * | 6/2016 | May | G02B 25/02 |
| 9,427,188 | B2 * | 8/2016 | Heine | A61B 5/0077 |
| 9,458,990 | B2 * | 10/2016 | Mullani | F21V 9/14 |
| 2007/0258248 | A1 * | 11/2007 | Duhe, Jr. | G02B 25/02 362/362 |
| 2013/0329309 | A1 * | 12/2013 | Huang | G02B 25/02 359/800 |

* cited by examiner

Primary Examiner — Ismael Negron

(57) ABSTRACT

The lighting attachment includes a casing, a flexible PCB (FPCB) disposed between inner and outer walls of the casing, a plurality of LEDs mounted along an edge of the FPCB, one or more rechargeable batteries mounted on the FPCB, a charging contact element arranged on the outer wall, a control means arranged on the outer wall, and a light guide mounted on a top end of the casing. The inner wall configured for receiving a cylindrical magnifying lens.

8 Claims, 5 Drawing Sheets

RECHARGEABLE LIGHTING ATTACHMENT FOR MAGNIFYING LENSES

BACKGROUND OF THE INVENTION

The present invention relates to a lighting attachment and more specifically relates to a lighting attachment which provides white and/or UV lighting to a hand-held magnifying lens or loupe.

There are available in the prior art hand-held magnifying lens or loupes which are provided with built-in lights so that users could perform viewing or macro photography under any lighting condition. However, as such lights are built-in, in case of malfunctioning, the lights are difficult to be replaced and thus users need to obtain a new magnifying lens or loupes which could be quite expensive. Whenever the light attachment can be removed, this provides only light from one side of the lens or loupe, and not a complete circle of light around the lens or loupe.

BRIEF SUMMARY OF THE INVENTION

In view of the aforesaid disadvantages now present in the prior art, the present invention provides a circular lighting attachment which provides white and/or UV lighting to a hand-held magnifying lens or loupe. The present invention is advantageous in that it is easy and convenient to be attached to or removed from the hand-held magnifying lens or loupe, while still providing circular light all around the lens or loupe.

To attain this, the present invention generally comprises:

a casing having an outer wall and an inner wall disposed on an outer periphery and an inner periphery of an annular flange respectively, with the annular flange defining a base of the casing, the inner wall having a lower height than the outer wall, and the inner wall having an inner surface configured for receiving a cylindrical hand-held magnifying lens or loupe;

a flexible PCB disposed between the inner wall and the outer wall of the casing, and having a length which extends substantially around a periphery of the inner wall of the casing and a width which substantially equals to the height of the inner wall;

a plurality of LEDs mounted along a first longitudinal edge of the flexible PCB distal to the base of the casing and electrically connected to the flexible PCB;

one or more rechargeable battery mounted on and electrically connected to the flexible PCB;

a charging contact element and a control means both exposed on the outer wall of the casing and electrically connected to the flexible PCB;

a light guide securely mounted on a top end of the casing which is opposite to the base of the casing to diffuse light emitted from the LEDs; the light guide is annular in shape with its outer periphery abutting against an inner periphery of a top end of the outer wall of the casing and its inner periphery aligning with a top end of the inner wall of the casing.

In one embodiment, the LEDs are evenly spaced along the first longitudinal edge of the flexible PCB. The LEDs may comprise white LEDs, RGB-LEDs and ultraviolet LEDs, with the RGB-LEDs configured to emit different color light to provide user interface information. The control means is in form of a capacitive touch control panel. At least one magnet is securely mounted near the charging contact element so as to hold a metallic charging plug in place against the charging contact element. A supporting plate is securely engaged with a slot on the outer wall of the casing such that the supporting plate and the outer wall form a cylinder, and the charging contact element, the magnet and the control means are mounted on the supporting plate. An outer casing is provided to cover the casing, and the outer casing has a slot for exposing a portion of the supporting plate where the charging contact element and the control means are disposed. The cylindrical hand-held magnifying lens or loupe has a flange at its base for engaging with a protective cap which serves as an eye cup of the lens or loupe. A top of the cylindrical hand-held magnifying lens or loupe extends outward from the outer casing for engaging with a transparent circular member with a frictional fit, and the transparent circular member encircles the top of the cylindrical hand-held magnifying lens or loupe to further diffuse the light diffused by the light guide. The lighting attachment is held between the protective cap and the transparent circular member so that the lighting attachment, the protective cap and the transparent circular member form a cylindrical block.

DETAILED DESCRIPTION OF THE INVENTION

Figure 1:
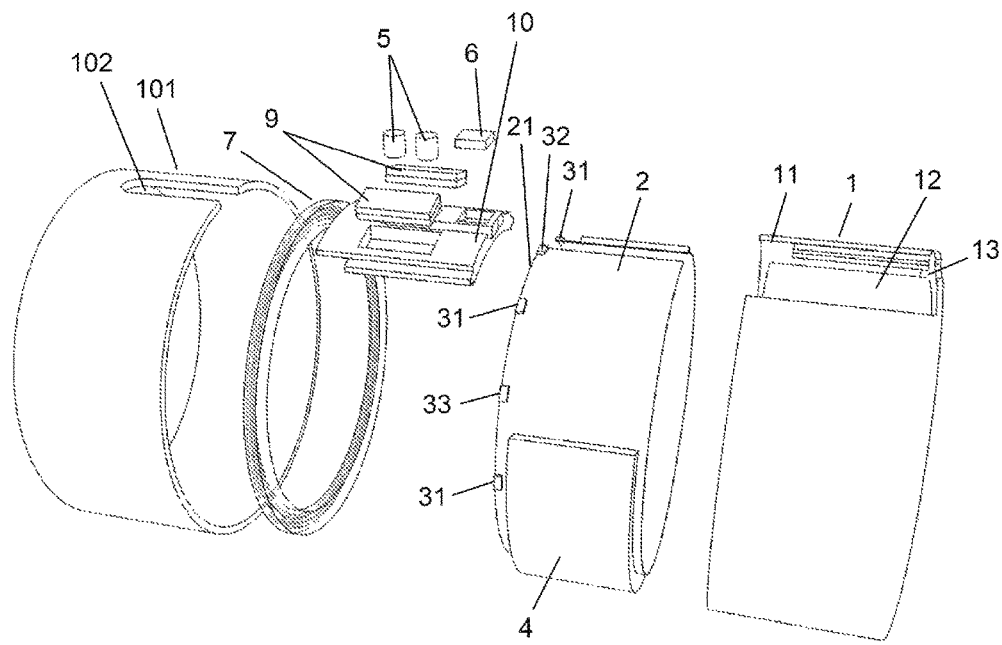
FIG. 1 shows a disassembling view of the preferred embodiment of the present invention.
Figure 2:
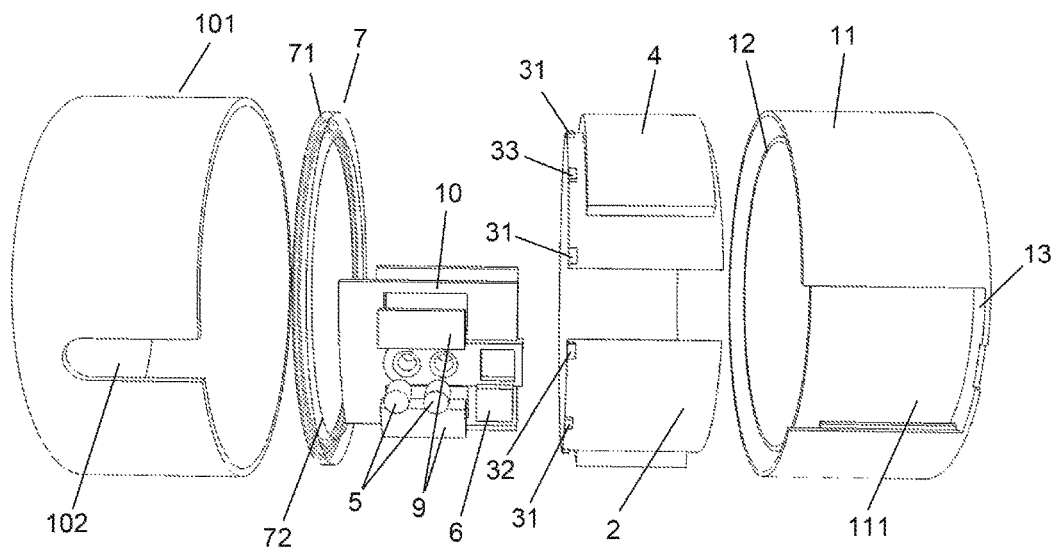
FIG. 2 shows another disassembling view of the preferred embodiment of the present invention.
Figure 3:
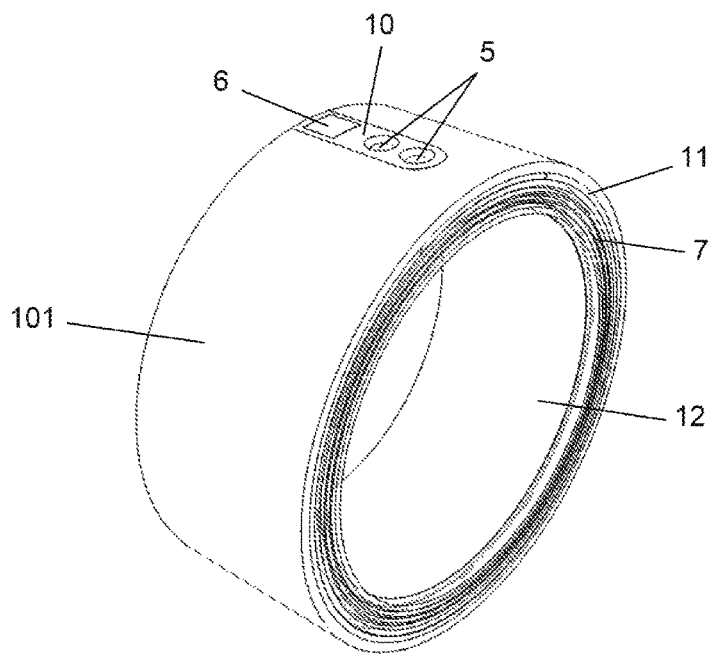
FIG. 3 shows a perspective view of the preferred embodiment of the present invention.
Figure 4:
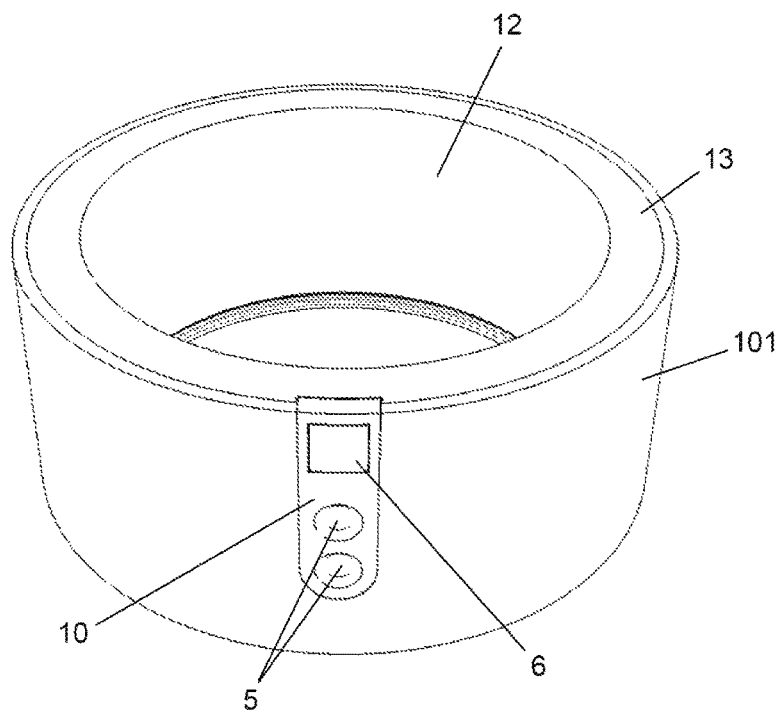
FIG. 4 shows another perspective view of the preferred embodiment of the present invention.
Figure 5:
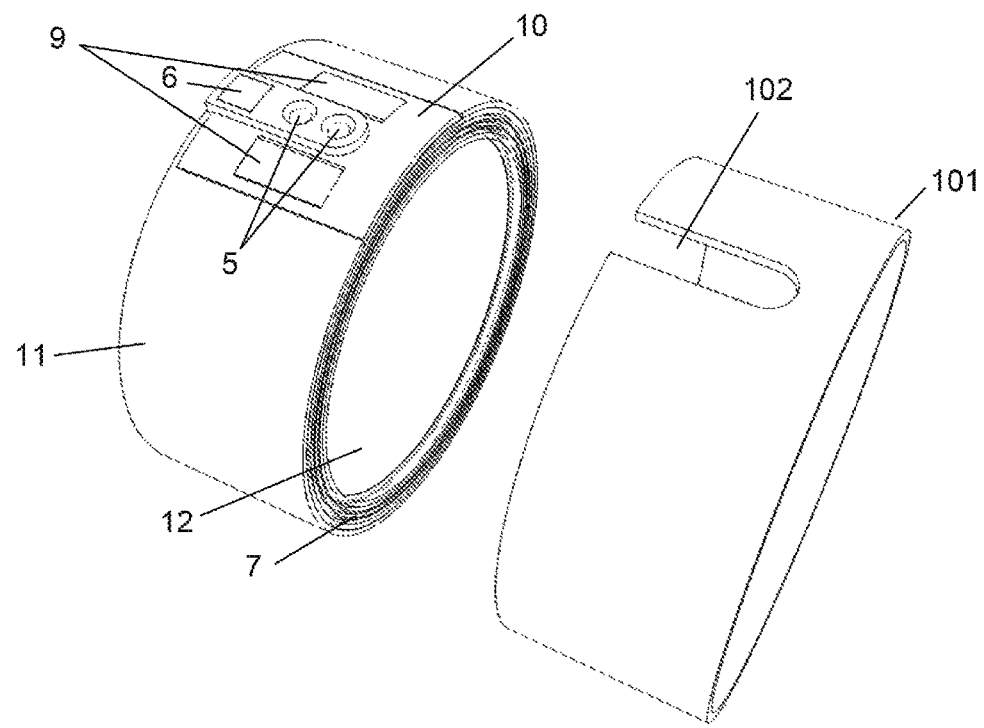
FIG. 5 shows a partially assembled view of the preferred embodiment of the present invention.
Figure 6:
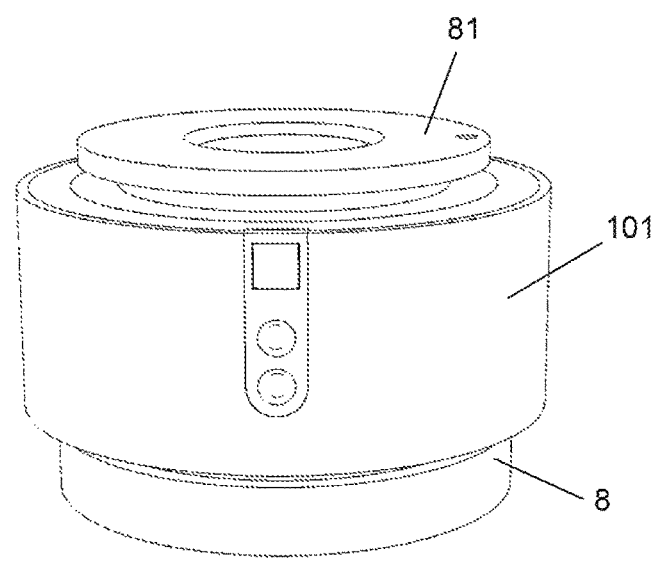
FIG. 6 shows the preferred embodiment of the present invention in use with a loupe.
Figure 7:
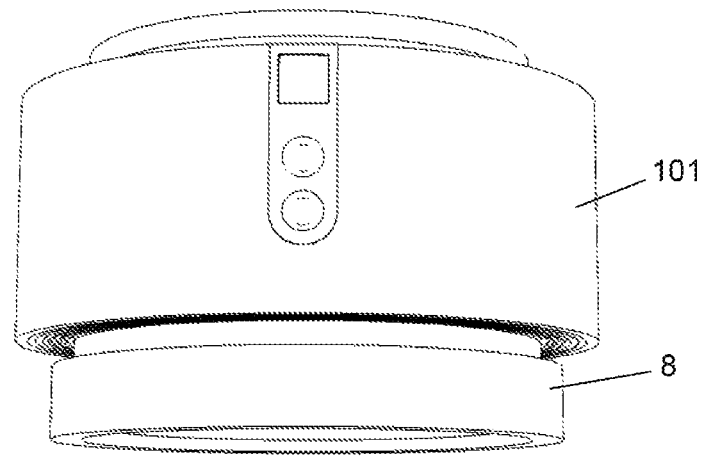
FIG. 7 shows another view of the preferred embodiment of the present invention in use with the loupe.
Figure 8:
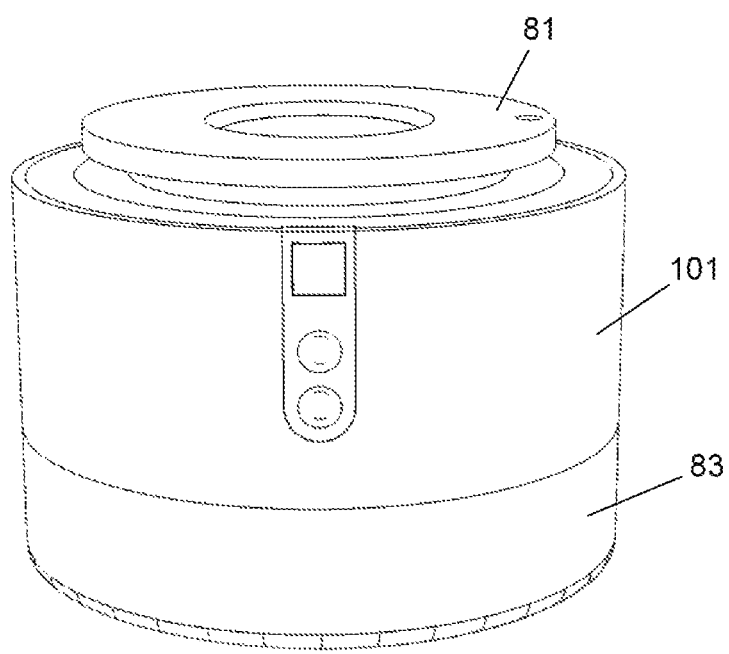
FIG. 8 shows the preferred embodiment of the present invention in use with the loupe and the transparent circular member.
Figure 9:
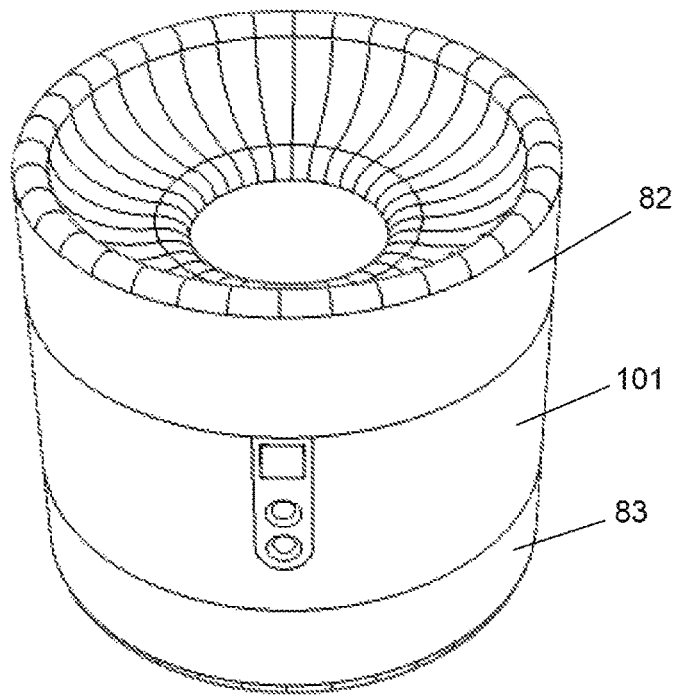
FIG. 9 shows the preferred embodiment of the present invention in use with the loupe, the transparent circular member and the protective cap.
Figure 10:
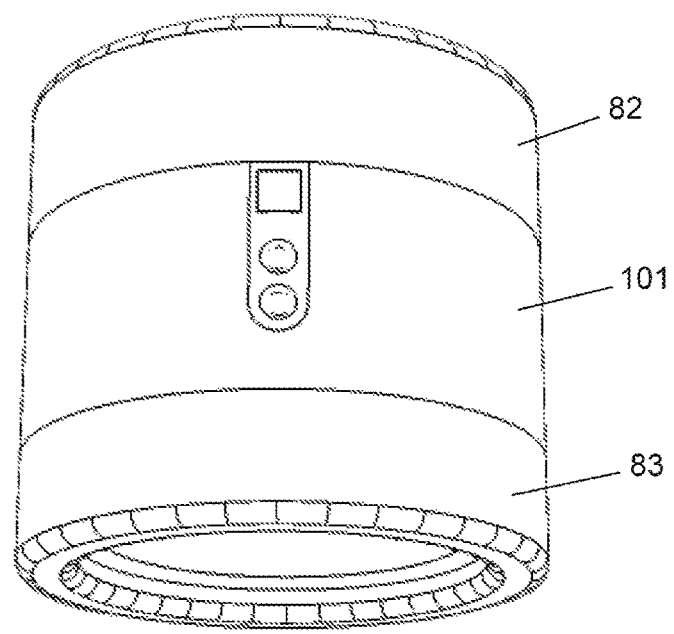
FIG. 10 shows another view of the preferred embodiment of the present invention in use with the loupe, the transparent circular member and the protective cap.

As illustrated in FIGS. 1 to 10, a preferred embodiment of the present invention comprises a casing 1, a flexible PCB 2, a plurality of LEDs 31, 32, 33, two rechargeable batteries 4, a charging contact element 5, a control means 6 and a light guide 7. The casing 1 has an outer wall 11 and an inner wall 12 disposed on an outer periphery and an inner periphery of an annular flange 13 respectively. The annular flange 13 defines a base of the casing 1. The inner wall 12 has a lower height than the outer wall 11, and the inner wall 12 has an inner surface configured for receiving a cylindrical hand-held loupe 8 (or a cylindrical hand-held magnifying lens in other embodiments).

The flexible PCB 2 is disposed between the inner wall 12 and the outer wall 11 of the casing 1. The flexible PCB 2 has a length which extends substantially around a periphery of the inner wall 12 of the casing 1 and a width which substantially equals to the height of the inner wall 12.

The LEDs 31, 32, 33 are mounted along a first longitudinal edge 21 of the flexible PCB 2 distal to the base of the casing 1 and electrically connected to the flexible PCB 2. In this embodiment, the LEDs 31, 32, 33 comprise six white LEDs 31 evenly spaced along the first longitudinal edge 21 of the flexible PCB 2 (i.e. the white LEDs 31 are separated from each other for 60 degrees) to provide white lighting, three ultraviolet LEDs 33 evenly spaced along the first longitudinal edge 21 of the flexible PCB 2 (i.e. the ultraviolet LEDs 33 are separated from each other for 120 degrees) to provide ultraviolet lighting, and one RGB-LEDs 32 which is configured to emit different color light to provide user interface information such as charging status, level of power remaining, light mode and so forth.

The rechargeable batteries 4 are mounted on and electrically connected to the flexible PCB 2.

The charging contact element 5 and a control means 6 are both exposed on the outer wall 11 of the casing 1 and electrically connected to the flexible PCB 2. In this embodiment, the control means 6 is in form of a capacitive touch control panel. Two magnets 9 are securely mounted near the two sides of the charging contact element 5 so as to hold a metallic charging plug in place against the charging contact element 5. A supporting plate 10 is securely engaged with a slot 111 on the outer wall 11 of the casing 1 such that the supporting plate 10 and the outer wall 11 form a cylinder, and the charging contact element 5, the magnets 9 and the control means 6 are mounted on the supporting plate 10.

The light guide 7 is securely mounted on a top end of the casing 1 which is opposite to the base of the casing 1 to diffuse light emitted from the LEDs 31, 32, 33. The light guide 7 is annular in shape with its outer periphery 71 abutting against an inner periphery of a top end of the outer wall 11 of the casing 1 and its inner periphery 72 aligning with a top end of the inner wall 12 of the casing 1.

In this embodiment, an outer casing 101 is provided to cover the casing 1, and the outer casing 101 has a slot 102 for exposing a portion of the supporting plate 10 where the charging contact element 5 and the control means 6 are disposed. The cylindrical hand-held loupe 8 has a flange 81 at its base for engaging with a protective cap 82 which serves as an eye cup of the cylindrical hand-held loupe 8. A top of the cylindrical hand-held loupe 8 extends outward from the outer casing 101 for engaging with a transparent circular member 83 with a frictional fit, and the transparent circular member 83 encircles the top of the cylindrical hand-held loupe 8 to further diffuse the light diffused by the light guide 7. The protective cap 82 and the transparent circular member 83 may be made with silicone. The present embodiment is held between the protective cap 82 and the transparent circular member 83 so that the present embodiment, the protective cap 82 and the transparent circular member 83 form a cylindrical block.

The above embodiment is a preferred embodiment of the present invention. The present invention is capable of other embodiments and is not limited by the above embodiment. Any other variation, decoration, substitution, combination or simplification, whether in substance or in principle, not deviated from the spirit of the present invention, is replacement or substitution of equivalent effect and falls within the scope of protection of the present invention.

What is claimed is:

1. A lighting attachment comprising:
    a casing having an annular flange defining a base of the casing, an outer wall disposed on an outer periphery of the flange, and an inner wall disposed on an inner periphery of the annular flange and having an inner surface configured to receive a cylindrical hand-held magnifying lens the inner wall having a lower height than the outer wall;
    a flexible PCB disposed between the inner wall and the outer wall of the casing, and having a length which extends substantially around a periphery of the inner wall of the casing and a width which substantially equals to the height of the inner wall;
    a plurality of LEDs mounted along a first longitudinal edge of the flexible PCB distal the base of the casing, and electrically connected to the flexible PCB;
    at least one rechargeable battery mounted on and electrically connected to the flexible PCB;
    a charging contact element and control means, both exposed on the outer wall of the casing and electrically connected to the flexible PCB;
    an annular light guide securely mounted on an end of the casing opposite the base, to diffuse light emitted from the LEDs, an outer periphery of the light guide abutting an inner periphery of a top end of the outer wall of the casing, and an inner periphery of the light guide aligning with a top end of the inner wall of the casing.

2. The lighting attachment as in claim 1, wherein the LEDs are evenly spaced along the first longitudinal edge of the flexible PCB.

3. The lighting attachment as in claim 1, the LEDs comprising white LEDs, RGB-LEDs and ultraviolet LEDs.

4. The lighting attachment as in claim 1, wherein the control means is a capacitive touch control panel.

5. The lighting attachment as in claim 1, further comprising at least one magnet securely mounted near the charging contact element and configured to hold a metallic charging plug in place against the charging contact element.

6. The lighting attachment as in claim 5, further comprising a slot formed on the outer wall of the casing, and a supporting plate securely engaged with the slot, such that the supporting plate and the outer wall form a cylinder, wherein the charging contact element, the magnet and the control means are mounted on the supporting plate.

7. The lighting attachment as in claim 6, further comprising an outer casing configured to cover the casing, and having a slot exposing a portion of the supporting plate.

8. The lighting attachment as in claim 7, further comprising a cylindrical hand-held magnifying lens having a flange configured for engaging with a protective cap which serves as an eye cup of the lens or loupe, wherein a top of the cylindrical hand-held magnifying lens extends outward from the outer casing for engaging with a transparent circular member with a frictional fit, and the transparent circular member encircles the top of the cylindrical hand-held magnifying lens or loupe to further diffuse the light diffused by the light guide; the lighting attachment is held between the protective cap and the transparent circular member so that the lighting attachment, the protective cap and the transparent circular member form a cylindrical block.

* * * * *